United States Patent [19]

Matsuura

[11] Patent Number: 4,636,398

[45] Date of Patent: * Jan. 13, 1987

[54] PROCESS FOR PRODUCTION OF STERILIZED PACKED TOFU

[75] Inventor: Masaru Matsuura, Noda, Japan

[73] Assignee: Kikkoman Corporation, Noda, Japan

[*] Notice: The portion of the term of this patent subsequent to Apr. 30, 2002 has been disclaimed.

[21] Appl. No.: 688,418

[22] Filed: Jan. 2, 1985

[30] Foreign Application Priority Data

Jan. 13, 1984 [JP] Japan ................................. 59-3530

[51] Int. Cl.$^4$ ........................... A23J 3/00; A23L 1/20
[52] U.S. Cl. .................................... 426/634; 426/407
[58] Field of Search ............... 426/489, 598, 519, 507, 426/634, 573, 656, 407, 412, 521, 582, 401

[56] References Cited

U.S. PATENT DOCUMENTS

| | | | |
|---|---|---|---|
| 1,444,812 | 2/1923 | Thévenot | 426/598 |
| 2,078,962 | 12/1935 | Miller | 426/598 |
| 4,000,326 | 12/1976 | Okada et al. | 426/407 |
| 4,140,811 | 2/1979 | Ogasa et al. | 426/521 |
| 4,514,433 | 4/1985 | Matsuura | 426/634 |

FOREIGN PATENT DOCUMENTS

0095152 8/1976 Japan.
0050941 12/1981 Japan.

*Primary Examiner*—Raymond N. Jones
*Assistant Examiner*—Marianne M. Cintins
*Attorney, Agent, or Firm*—Banner, Birch, McKie & Beckett

[57] ABSTRACT

A process for the production of retort packed tofu is provided. The steps of the process include removing at least 45% of the soluble saccharide content of soybeans, grinding the resulting soybeans with water in an amount of 2 to 6 times the weight of soybeans, heating the resulting soybean slurry and filtering to obtain a soybean milk, admixing the soybean milk with a coagulant, filling the resulting mixture in a container, then sealing tightly the container, and heating the sealed container to effect simultaneously sterilization and coagulation.

5 Claims, No Drawings

PROCESS FOR PRODUCTION OF STERILIZED PACKED TOFU

BACKGROUND OF THE INVENTION

1. Field of the Invention

This invention relates to a novel process for producing retort packed tofu.

2. Description of the Prior Art

Since the development of a new coagulant glucono-delta-lactone (hereinafter referred to as GDL), a large-scale production of packed tofu has become possible. Because of the convenience in production and a shelf life of some lengths, this type of packed tofu has given rise to a new way of distribution for tofu. However, although suitable for the large-scale production, conventional processes do not produce sterile tofu capable of being stored for an extended period of time. In order to solve the problem, various processes have been proposed for the production of packed sterile tofu which can be stored for a prolonged period of time even at ambient temperatures. These processes for producing packed sterile tofu are broadly classified into two groups, the one group including those in which the sterilized soybean milk is aseptically packed in a container (aseptic packed tofu) and the other including those in which the packed soybean milk is finaly subjected to coagulation and sterilization by the heat treatment (retort packed tofu). The latter group of processes are superior to the former on account of easier operation and lower investment.

The retort packed tofu, however, has its own disadvantages resulting from the heat treatment at high temperaures, such as syneresis during the treatment, a specific disagreeable flavor, discoloration, and deteriorration in taste and textrure. As to the phenomenon of syneresis it has been attempted, for example, to use an anti-syneresis agent [Japanese Patent Application "Kokai" (Laid-open) No. 95,152/76] or to carry out preliminary heating at high temperatures before the retort treatment (Japanese Patent Publication No. 50,941/81). For other problems of discoloration, disagreeable flavor, and deterioration in taste and texture, there has been made none of proposals for their solution.

SUMMARY OF THE INVENTION

The present inventor carried out an extensive study on the above-mentioned problems in the production of retort packed tofu, and could solve the problems by removing at least 45% of the soluble saccharides from starting material soybeans. Based on the above finding this invention has been accomplished.

An object of this invention is to provide a process for producing retort packed tofu which can be stored for an extended period of time.

DETAILED DESCRIPTION OF THE INVENTION

The invention is described in detail in the following.

The soybeans used as starting material can be either whole beans or dehulled beans. Prior to grinding, the beans are removed of at least 45%, preferably 50% or more, of the soluble saccharides. The soluble saccharides, as herein referred to, are those saccharides which are leached with water when the soybeans are soaked or ground in water. The total saccharide content is determined in the following manner.

The soybeans are soaked in a predetermined quantity of water, then ground in the soaking water, and filtered to separate a soybean milk as the filtrate. The soybean milk is adjusted to pH 4.5 with hydrochloric acid to precipitate the protein which was separated by centrifuging. The supernatant is assayed for the saccharide content by the method of phenol-sulfuric acid and is expressed in terms of glucose content.

The soluble saccharides are removed by soaking the soybeans in water. To remove 45% or more of the soluble saccharides, the soybeans are soaked at 50° to 60° C. for 6 to 8 hours in the case of whole soybeans and at 40° to 60° C. for 1 to 3 hours in the case of dehulled soybeans. To minimize the flavor of oxidized lipids, it is desirable to soak the soybeans at a temperature in the range where the activity of lipoxidase are restrained, such as, for example, a temperature of 40° C. or above. In an example of preferred embodiments, the dehulled soybeans are soaked at 45° to 55° C. for 2 hours or thereabout.

In leaching the soluble saccharides into cold or hot water from whole or dehulled soybeans, it is desirable to soak as far as practicable the soybeans as such without exerting any injury to the cotyledon or other parts of the soybeans, because if the cells of soybeans are ruptured by crushing or cracking of whole or dehulled soybeans, there will appear disagreeable odor or taste and also occur leaching of proteins together with saccharides, leading to the increased loss of the proteins. Further, it is desirable to soak the soybeans in water adjusted to pH 8 to 11 with sodium carbonate or the like, because such soaking water removes the bitter taste and off-flavor of soybeans, thus enhancing the flavor of tofu.

The soybeans without at least 45% of the saccharide content thus obtained are washed with water if necessary, then drained, and ground together with water in an amount of 2 to 6 times the weight of soybeans in a grinder. Although the grinding can be performed at normal temperature, it is desirable to grind at 40° to 50° C. in order to produce tofu of fine texture and to control the activity of lipoxidase during the grinding. In grinding the soybeans, the addition of a small amount of monoglyceride favors the efficiency of protein extraction. Further, the addition of a small amount of sodium ascorbate or tocopherol inhibits oxidation and favorably affects the retort treatment, resulting in more desirable tofu which has no disagreeable flavor.

The slurry of soybeans obtained by the grinding is heated at 95° to 110° C. for 0.5 to 5 minutes, and filtered to separate the soybean milk. The heating of slurry should be done as quickly as possible, preferably within 3 minutes, after the grinding. It is undesirable to leave the slurry standing for a long time because of acceleration of syneresis during the retort treatment.

The soybean milk, if necessary, is homogenized in a high pressure homogenizer and then deaired. If necessary, the soybean milk is preliminarily heated at a high temperature for a short period of time such as, for example, 1 to 5 seconds at 130° to 140° C. After cooling, the preheated soybean milk is filled together with a coagulant into a container and the container is tightly sealed. The preheating at a high temperature for a short period of time is desirable, because it serves not only to destroy the heat-tolerance bacillus spores adhered to the soybeans but also to alleviate the conditions of heat sterilization in retort treatment, resulting in reduction of both discoloration and disagreeable flavor of the product tofu. The preheating, moreover, has a repressive effect on the syneresis which tends to take place in the retort treatment.

The container for tofu should be heat resistant one made of those resins which are generally used in the cooked foods with retort pack, such as, for example, polyethylene, polypropylene, saponified ethylene-vinyl acetate copolymer, and polyvinylidene chloride. The coagulants are those which are generally used in the production of tofu, such as GDL, calcium sulfate, cal- 0.3% (W/W), then filled in a heat resistant container, 64×64×32 mm (LAMICON CUP made from a saponification product of ethylene-vinyl acetate copolymer, manufactured by Tokan Kogyo Co.), then sealed tightly, and heated at 120° C. for 32 minutes in a retort sterilizer (type RCS 40 RTG of Hisaka Seisakujo Co.) to effect heat sterilization and coagulation. After cooling, there was obtained retort packed tofu. The color and flavor of this retort packed tofu were tested immediately after the preparation and after the storage at 30° C. for 60 days. The results obtained were as shown in Table 1.

TABLE 1

| Sample No. | Soaking conditions (°C., hour) | Percent removal of soluble saccharides (%) | Immediately after preparation Color** | | | Disagreeable flavor*** | After storage at 30° C. for 60 days Color | | | Disagreeable flavor |
|---|---|---|---|---|---|---|---|---|---|---|
| | | | L | a | b | | L | a | b | |
| 1 | 30° C., 1 | 32.3 | 82.44 | −0.39 | 11.99 | ++ | 78.46 | 0.50 | 11.81 | +++ |
| 2 | 50° C., 1 | 40.5 | 82.39 | −0.40 | 11.94 | ± | 79.39 | 0.05 | 11.85 | ++ |
| 3 | 50° C., 1.5 | 44.5 | 82.15 | −0.42 | 11.59 | − | 79.53 | −0.12 | 11.69 | ± |
| 4 | 50° C., 2 | 51.3 | 82.99 | −0.50 | 11.55 | − | 80.22 | −0.20 | 11.67 | − |
| 5 | 50° C., 2* | 71.0 | 83.59 | −0.48 | 11.33 | − | 81.17 | −0.29 | 11.50 | − |

Note:
*After soaking for one hour, the soaking water was replaced by fresh water at 50° C. and the soaking was continued for further one hour.
**Measured by color and color difference meter.
***Disagreeable flavor:
− None
± Substantially none
+ Detectable
++ Strong
+++ Very strong cium chloride, and magnesium chloride. These coagulants can be used each alone or in combinations.

The soybean milk sealed together with the coagulant in the container is then subjected to retort treatment to sterilize and coagulate the milk. The retort treatment is performed at 120° to 140° C. for 4 to 60 minutes by using a common retort sterilizer. It is possible to produce a retort packed tofu less subject to syneresis by the following preheating, prior to the retort treatment under the above conditions. The packed soybean milk is preheated at an internal temperature of 60° to 75° C. for 2 minutes or more, preferably 2 to 10 minutes, or preheated to an internal temperature of 65° to 85° C. by exposing to a high-frequency radiation. After the retort treatment the packed tofu is cooled, for example, with water to obtain a final product.

The retort packed tofu produced as described above is white in color, free of disagreeable flavor, and excellent in taste and texture.

The following Experimental Example is presented to demonstrate the effectiveness of the invention.

EXPERIMENTAL EXAMPLE

Dehulled soybeans were removed of the soluble saccharides by soaking under the conditions as shown in Table 1. The percent removal of the soluble sacchardies [(weight of saccharides leached into soaking water)/(weight of soluble saccharides in soybeans)] was as shown in Table 1.

The soaked soybeans were drained, then washed with water, and ground with water at 50° C. in a grinder (Model LM-S of Tokushukika Kogyo Co.). Immediately thereafter, steam was blown into the resulting soybean slurry to effect the heating at 100° C. for 0.5 minute. After being cooled to 80° C., the slurry was filtered to separate the soybean milk. Steam was blown into the soybean milk to preheat it at 138° C. for 3 seconds and then the milk was cooled. The cooled soybean milk was admixed with GDL to a concentration of As is apparent from the results shown in Table 1, the tofu (sample Nos. 3 to 5) prepared by using soybeans removed of a large amount of soluble saccharides was excellent in quality, being white in color, free of disagreeable flavor, and of desirable taste and texture. These samples were also less subject to brown discoloration and deterioration in flavor during storage, indicating a sufficient shelf life at normal temperature.

One of the features of the retort packed tofu according to this invention is such that when served as "yudofu" (tofu in water kept boiling), the tofu becomes neither spongy nor deteriorated in texture even if boiling is continued for an extended period of time.

The invention is illustrated below with reference to Examples.

EXAMPLE 1

Into 50 liters of hot water at 50° C., was soaked 10 kg of dehulled soybeans. After soaking for one hour at 50° C., the soaking water was replaced by fresh water at 50° C., and the soaking was continued for further one hour (2 hours of total soaking time). To the drained soybeans, were added 80 g of a monoglyceride and 30 g of sodium ascorbate. While continuously adding 40 liters of hot water at 50° C., the soybeans were ground in a grinder (type LM-S of Tokushukika Kogyo Co.). During the grinding, the soybean slurry was kept at 48° C. Immediately after grinding, steam was blown into the soybean slurry through a steam pipe provided in the discharge pipe of the grinder. The temperature of the soybean slurry was kept at 100° C. for 30 seconds, then cooled to 80° C., and the slurry was filtered through a pressure filter provided with a 100-mesh screen. The filtrate was immediately cooled down in a reduced-pressure tank while removing the air to obtain a soybean milk. The soybean milk was homogenized under a pressure of 300 kg/cm² (G) and discharged into a reduced-pressure tank to effect deairing. The resulting soybean milk was preliminarily heat sterilized by heating at 138° C. for 2 seconds by means of a plate heater (Model P-20 of Alfa Laval Co.). The soybean milk was cooled to 25° C. by means of a plate cooler. To the cooled soybean milk, was added GDL to a concentration of 0.3%. The soybean milk was then filled in a heat resistant container, 64×64×32 mm (LAMICON CUP of Tokan Kogyo Co.), and sealed tightly. The resulting packed soybean milk was subjected to the retort treatment at 120° C. for 30 minutes in a retort sterilizer (Model RCS 40 RTG of Hisaka Seisakujo Co.), and then cooled down to 25° C. in water to obtain retort packed tofu.

EXAMPLE 2

A soybean slurry obtained in a similar manner to that in Example 1 was heated at 105° C. by blowing steam into the slurry, then kept at 105° C. for 30 seconds, cooled to 85° C., and treated as in Example 1 to obtain a soybean milk. Without having been subjected to preliminary heat sterilization, the soybean milk was admixed with a coagulant, then filled in a container, sealed tightly, subjected to the retort treatment at 120° C. for 40 minutes, and cooled to obtain retort packed tofu.

EXAMPLE 3

Into 37 liters of hot water (45° C.) adjusted to pH 10.0 with sodium carbonate, was added 7 kg of dehulled soybeans. The soaking was continued for one hour with occasional stirring. The soaking water was replaced by fresh water at 45° C. (PH 10) and the soaking was again continued for further one hour. The soaking water was maintained at 45° C. throughout a total of two hours of soaking. After soaking, the beans were drained and washed with water. To the soybeans, were added 50 g of a monoglyceride and 20 g of a vitamin E powder (20% in vitamin E content). The mixture was continuously ground in a grinder (type LM-S of Tokushukika Kogyo Co.), while adding 30 liters of hot water at 47° C. The grinding temperature was 45° C. The soybean slurry was heated at 105° C. for 3 minutes by blowing steam into the slurry. The heated soybean slurry was cooled to 85° C. by means of a plate cooler and centrifuged to separate the soybean milk. The soybean milk was discharged into a reduced-pressure tank to effect simultaneously deairing and cooling to 30° C. The cooled soybean milk was homogenized under a pressure of 300 kg/cm$^2$ in a homogenizer (Model 3H of Manton-Gaulin Co.) and again discharged into a reduced-pressure tank to effect deairing. The resulting soybean milk was heated at 138° C. for 3 seconds by means of a plate heater (Model P-20 of Alfa Laval Co.), and immediately cooled down to 20° C. To the cooled soybean milk was added a 30% GDL solution, which had been filtered through an aseptic filter, so that the GDL content of the milk may become 0.35%. After mixing, the soybean milk was filled in a heat resistant container of the gusset type, and the container was tightly sealed by heat-sealing. The sealed container was heated at 95° C. for 5 minutes with steam in the same retort sterilizer as used in Example 1 and immediately thereafter heat-sterilized at 125° C. (the temperature inside the sterilizer) for 28 minutes by introducing hot water at 130° C. into the sterilizer. The sterilized packed tofu was cooled in water down to room temperature to obtain retort packed tofu.

What is claimed is:

1. A process for the production of sterilized packed tofu, which comprises soaking either whole or dehulled soybeans in water at a temperature of 40° C. to 60° C. for a period of time sufficient to remove at least 45% of the soluble saccharide content of the soybeans, grinding at a temperature of 40° C. to 50° C. the resulting soaked soybeans with water in an amount of 2 to 6 times the weight of the soybeans, heating the resulting soybean slurry and filtering to obtain a soybean milk, admixing the soybean milk with a coagulant, filling the resulting mixture in a container, then sealing tightly the filled container, and heating the sealed container at a temperature and for a period of time sufficient to effect simultaneously sterilization and coagulation of the soybean milk thereby making a sterilized packed tofu.

2. A process according to claim 1, wherein dehulled soybeans are soaked for between 1.5 to 3 hours.

3. A process according to claim 1, wherein dehulled soybeans are soaked in water at pH 8 to 11 and at a temperature of 45° C. to 55° C. for between 1.5 to 2.5 hours.

4. A process according to claim 1, wherein the soybean milk tightly sealed in the container is preliminarily heated at an internal temperature of 60° to 75° C. for 2 to 10 minutes and then heated under applied pressure at 120° to 140° C. for 4 to 60 minutes to effect simultaneously sterilization and coagulation.

5. A process according to claim 1, wherein the process comprises the steps in sequence of soaking dehulled soybeans in water at 45° to 55° C. and pH 8 to 11 for 1.5 to 2.5 hours to remove the soluble saccharide content of the soybeans; grinding the resulting soybeans with water in an amount of 2 to 4 times the weight of the soybeans at 40° to 50° C. to obtain a soybean slurry; heating the soybean slurry at 95° to 110° C. for 0.5 to 5 minutes and then filtering the slurry to obtain a soybean milk; deairing the soybean milk under reduced pressure; homogenizing the desired soybean milk in a high-pressure homogenizer, heating the homogenized soybean milk at 130° to 140° C. for 1 to 5 seconds, and then cooling the soybean milk; adding a coagulant to the cooled soybean milk, filling the milk in a container, and sealing tightly the filled container; and preheating the sealed soybean milk at an internal temperature of 60° to 75° C. for 2 to 10 minutes, and then heating the sealed soybean milk at 120° to 140° C. for 4 to 60 minutes to effect simultaneously sterilization and coagulation of the soybean milk.

* * * * *